(12) United States Patent
Shahindoust et al.

(10) Patent No.: US 7,478,383 B2
(45) Date of Patent: Jan. 13, 2009

(54) SYSTEM AND METHOD FOR REMOTELY SECURING SOFTWARE UPDATES OF COMPUTER SYSTEMS

(75) Inventors: Amir Shahindoust, Laguna Niguel, CA (US); Mustafa Seifi, Laguna Niguel, CA (US)

(73) Assignees: Toshiba Corporation (JP); Toshiba Tec Kabushiki Kaisha (JP)

( * ) Notice: Subject to any disclaimer, the term of this patent is extended or adjusted under 35 U.S.C. 154(b) by 641 days.

(21) Appl. No.: 10/806,960

(22) Filed: Mar. 23, 2004

(65) Prior Publication Data

US 2005/0216906 A1  Sep. 29, 2005

(51) Int. Cl.
G06F 9/44 (2006.01)
G06F 17/30 (2006.01)

(52) U.S. Cl. .......... 717/172; 726/28
(58) Field of Classification Search ......... 717/171–173; 726/28

See application file for complete search history.

(56) References Cited

U.S. PATENT DOCUMENTS

| | | | |
|---|---|---|---|
| 5,155,847 A | 10/1992 | Kirouac et al. | |
| 5,752,042 A | 5/1998 | Cole et al. | |
| 5,870,610 A | 2/1999 | Beyda | |
| 5,919,247 A | 7/1999 | Van Hoff et al. | |
| 5,960,204 A | 9/1999 | Yinger et al. | |
| 6,006,034 A | 12/1999 | Heath et al. | |
| 6,151,643 A * | 11/2000 | Cheng et al. | 710/36 |
| 6,167,567 A | 12/2000 | Chiles et al. | |
| 6,199,204 B1 | 3/2001 | Donohue | |
| 6,256,668 B1 | 7/2001 | Slivka et al. | |
| 6,282,709 B1 | 8/2001 | Reha et al. | |
| 6,282,711 B1 | 8/2001 | Halpern et al. | |
| 6,347,398 B1 | 2/2002 | Parthasarathy et al. | |
| 6,457,076 B1 * | 9/2002 | Cheng et al. | 710/36 |
| 6,477,703 B1 | 11/2002 | Smith et al. | |
| 6,493,871 B1 | 12/2002 | McGuire et al. | |
| 6,546,492 B1 * | 4/2003 | Walker et al. | 726/3 |
| 2002/0100036 A1 | 7/2002 | Moshir et al. | |
| 2003/0016959 A1 | 1/2003 | Fujikura et al. | |

(Continued)

OTHER PUBLICATIONS

Daniel Mettler, "Secure Software Updates for Mobile Devices," Jul. 12, 2002, Sept. of Information Technology—University of Xurich, pp. 1-34.*

*Primary Examiner*—Eric B Kiss
(74) *Attorney, Agent, or Firm*—Tucker Ellis & West LLP

(57) ABSTRACT

A method for providing a subscription service wherein a remote host enables the automatic receipt at a customer site of the most recent updates, patches, or fixes for services the customer site is running. The remote host uses a secured private port to transfer the updates to the subscribed systems. A remote host server searches an update database for updates of the services from a list configured by an administrator. The host server then downloads the updates and notifies the administrator that an update is available. An update script is subsequently generated, allowing the update to be pushed to a subscribing system. The host server the searches a listing of subscribing systems to determine which subscribing systems run a service for which an update is available. The host server, through a private port, uploads the content to the subscribing system automatically. The communication port is a secured port that will require authentication of the host server by the subscribing system prior to uploading.

26 Claims, 3 Drawing Sheets

U.S. PATENT DOCUMENTS

| | | |
|---|---|---|
| 2003/0023963 A1 | 1/2003 | Birkholz et al. |
| 2003/0028869 A1 | 2/2003 | Drake et al. |
| 2003/0031029 A1 | 2/2003 | Kawaai et al. |
| 2003/0145317 A1 | 7/2003 | Chamberlain |
| 2003/0192041 A1 | 10/2003 | Mentze et al. |
| 2004/0003266 A1 | 1/2004 | Moshir et al. |
| 2004/0044999 A1 | 3/2004 | Gibson |

* cited by examiner

SYSTEM AND METHOD FOR REMOTELY SECURING SOFTWARE UPDATES OF COMPUTER SYSTEMS

BACKGROUND OF THE INVENTION

This invention is directed to a system and method for remotely securing software updates for computer systems. More particularly, this invention is directed to a system and method for providing software updates and patches to remote computers and other data processing devices.

Security is an important issue for computer users as it pertains to their computers, networks, and related products. Computer users want to ensure that their computers and software products are secure from hackers, viruses, and similar types of problems. Computers and the software products used therein must be monitored constantly for such security breaches. In addition, new technology and methods are always being developed to invade computers and related software products. Therefore, software updates, patches, and fixes must be developed to prevent such breaches and then provided to the computer user. Typically to obtain such updates, the computer user must visit the computer or software company's website to obtain the update. This requires the user to have knowledge that the update exists and then have the ability to obtain and download the update. Often computer users are not aware of such updates or do not know how to obtain such updates. In addition, if the user uses several different software products, the user must visit the website for each product and obtain the update for each product.

The subject invention remedies the afore-noted problems, and provides a mechanism by which updates, patches, and fixes are automatically provided to computer users.

SUMMARY OF THE PRESENT INVENTION

In accordance with the present invention, there is provided a mechanism by which updates, patches, and fixes are automatically provided to computer users.

Further, in accordance with the present invention, there is provided system and method for remotely securing software updates for to remote computers and other data processing devices.

Still further, in accordance with the present invention, there is provided a system and method wherein the most recent security updates, fixes, and patches will be provided for the various components, libraries, services, servers, modules, and other programs used by a remote computer or data processing device.

Still further, in accordance with the present invention, there is provided a system for remotely securing software updates of computer systems. The system comprises a server adapted to receive software updates from a plurality of sources and means adapted to receive installation scripts, each of which is associated with at least one software update disposed on the server. The system also comprises a secured user data storage adapted to store data representative of a plurality of end users and authentication means adapted for receiving a login request from at least one remote data processing device including means adapted for comparing the received login request with the secured user data. The system further comprises means adapted for selectively placing the server in data communication with at least one remote data processing device in accordance with a determination of the authentication means and means adapted for selectively transmitting software updates from the server, along with an associated installation script, in accordance with a received login request.

In a preferred embodiment, the system includes means adapted for periodically establishing a communication link between the server and the at least one remote data processing device to provide for regular communication of software updates therebetween. In one embodiment, the software updates are transmitted automatically upon receipt of a software update. In another embodiment, the software updates are transmitted manually upon a determination of an associated system administrator or other authorized user.

In a preferred embodiment, the system includes testing means adapted for analyzing the received software updates to determine if the software updates are in compliance with selected criteria. Preferably, the system also comprises a software update storage log means adapted to store selected information relating to received software updates.

Still further, in accordance with the present invention, there is provided a method for remotely securing software updates of computer systems. The method comprises the steps of receiving, at a server, software updates from a plurality of sources and receiving installation scripts at the server, each of which is associated with at least one software update disposed on the server. The method further comprises the steps of storing data representative of a plurality of end users in a secured user data storage means and receiving a login request from at least one remote data processing device and comparing the received login request with the secured user data. The method also comprises the steps of selectively placing the server in data communication with at least one remote data processing device in accordance with a determination of the authentication means and selectively transmitting software updates from the server, along with an associated installation script, in accordance with a received login request.

In a preferred embodiment, the method includes the step of periodically establishing a communication link between the server and the at least one remote data processing device to provide for regular communication of software updates therebetween. In one embodiment, the software updates are transmitted automatically upon receipt of a software update. In another embodiment, the software updates are transmitted manually upon a determination of an associated system administrator or other authorized user.

In a preferred embodiment, the method also includes the step of analyzing the received software updates to determine if the software updates are in compliance with selected criteria. Preferably, the method also comprises the step of storing selected information relating to received software updates.

These and other aspects, advantages, and features of the present invention will be understood by one of ordinary skill in the art upon reading and understanding the specification.

DETAILED DESCRIPTION OF THE PREFERRED EMBODIMENTS

Figure 1:
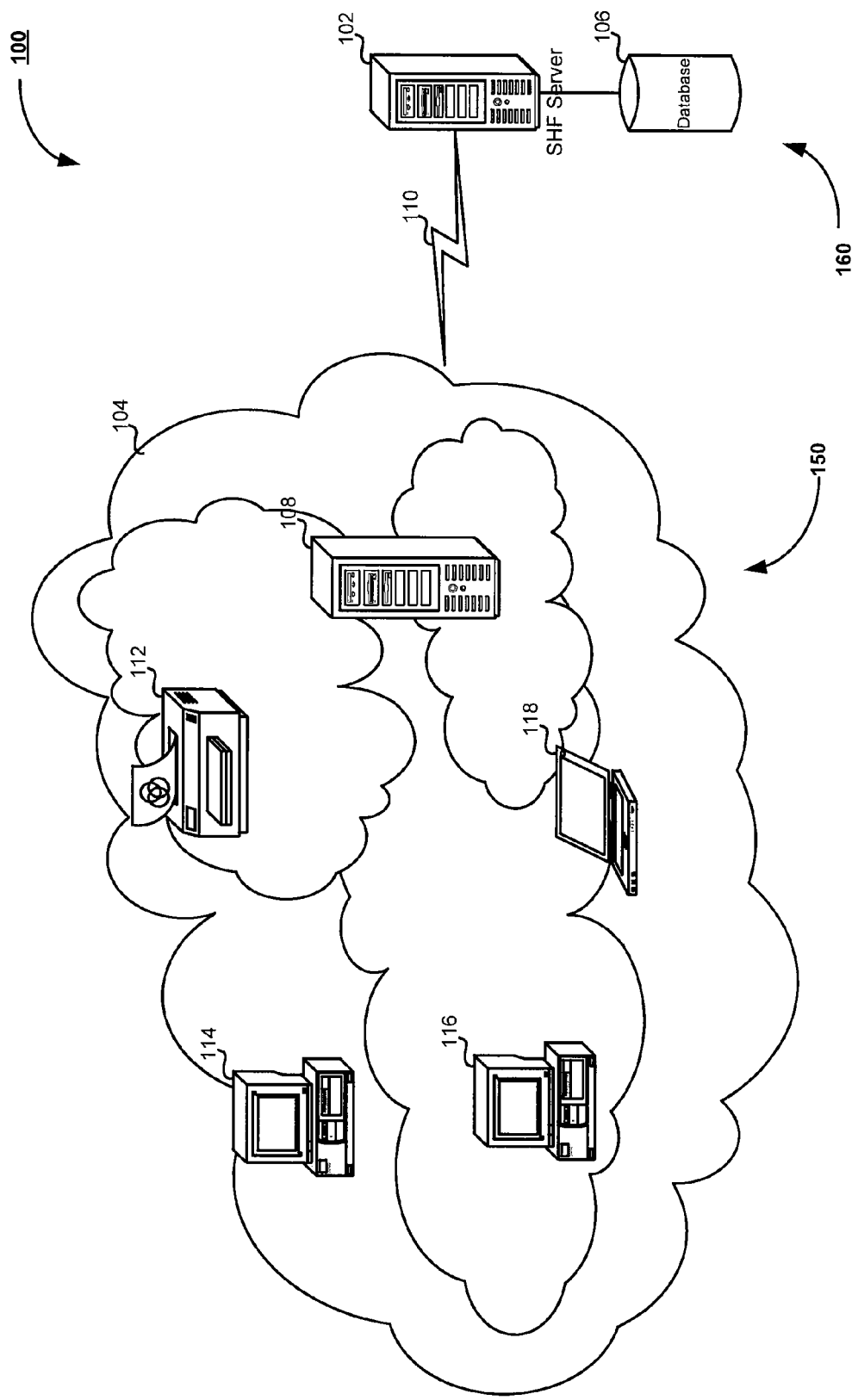
FIG. 1 is a block diagram of an exemplary system according to the present invention.

Turning now to the drawings wherein the illustrations are for illustrating the preferred embodiment only, and not for delivering the same. Referring to FIG. 1, there is shown an exemplary system 100 for remotely securing software updates of computer systems contemplated by the present invention. The system 100 comprises a customer site 150 and a remote site 160. The remote site 160 suitably comprises a database 106 communicatively coupled to a security hot fix server 102. In the preferred embodiment, the database 106 contains the most current security updates, or fixes, for various components, libraries, servers and modules. The database 106 further contains past updates or fixes, as determined by a system administrator. The server 102 may obtain the fixes or updates from the database 106 either manually, at the direction of the system administrator, or automatically.

The customer site 150 comprises multiple systems, shown in FIG. 1 as 112, 114, 116 and 118, as well as server 108. The server 108 and each of the systems 112, 114, 116 and 118 are interconnected via a local area network 104. It will be appreciated by those skilled in the art that the inclusion of the server 108 on the local area network 104 is for illustrative purposes only and other means for generating a computer network may be used. As will be appreciated by those skilled in the art, the server 108, may be, for example an applications server, running programs which are then displayed each system 112, 114, 116, and 118, or the like. Furthermore, the server 108 may be a print server, receiving print jobs from each system 114, 116, and 118, processing the same and forwarding the processed jobs to the printer 112.

The server 102 at the remote site 160 is in communication with the local area network 104 via a communications signal 110. It will be appreciated by those skilled in the art that the communications signal 110 may be any form of connection between the server 102 and the local area network 104, including, but not limited to a direct connection, connection via the Internet or intranet, dial-in or other suitable means of connecting a remote computer to a network.

In a preferred embodiment, the communications signal 110 is a secure connection using hypertext transfer protocol, or HTTP. The security of the communications signal 110 is suitably a secure sockets layer, or SSL. It will be appreciated by those skilled in the art that other secured transmission protocols for securely connecting and registering the server 102 with the local area network 104 may be used and the present invention need not be limited to the use of SSL encryption and security measures.

At the customer site 150, a system administrator will register each system 112, 114, 116, and 118 with the server 102 to receive hot fixes. In other words, the system administrator establishes a secure connection 110 from the server 108, or the network 104 to the server 102 using SSL over HTTP and registers each system 108, 112, 114, 116, and 118. As part of the registration process, the system administrator at the customer site 150 provides, or allows each system 108, 112, 114, 116, and 118 to provide model number, version of software and the like. During the registration process, the system administrator at the customer site 150 selects preferences, such as when to receive uploads, manual or automatic application of the updates or fixes, and the like. It is while registering each system 108, 112, 114, 116, and 118 that the customer site 150 system administrator gives appropriate credentials to the server 102 to enable authentication with each system 108, 112, 114, 116, and 118 on the local area network 104. As will be appreciated by those skilled in the art, suitable credentials may, for example be a username and password combination, digital certificate, digital signatures or other verification means. The skilled artisan will understand that the method of authenticating the server 102 need not be limited to the use of a username and/or password.

In a preferred embodiment, the remote site 160 is linked to the customer site 150 though a secured private port, whereby each system 108, 112, 114, 116, and 118 of the customer site 150 will automatically receive the latest updates and patches of the services that are running. The server 102 uses the secured private port to transfer the updates from the database 106 to the system or systems that have subscribed to an update service provided by the remote site 160. As will be understood in the art, the updates, patches, or fixes will be pushed to each system requiring the update, provided such a system is subscribing to the service hosted by the server 102 at the remote site 160. The foregoing system may best be understood with reference to the subsequent figures, describing the method and implementation of the present invention.

Figure 2:
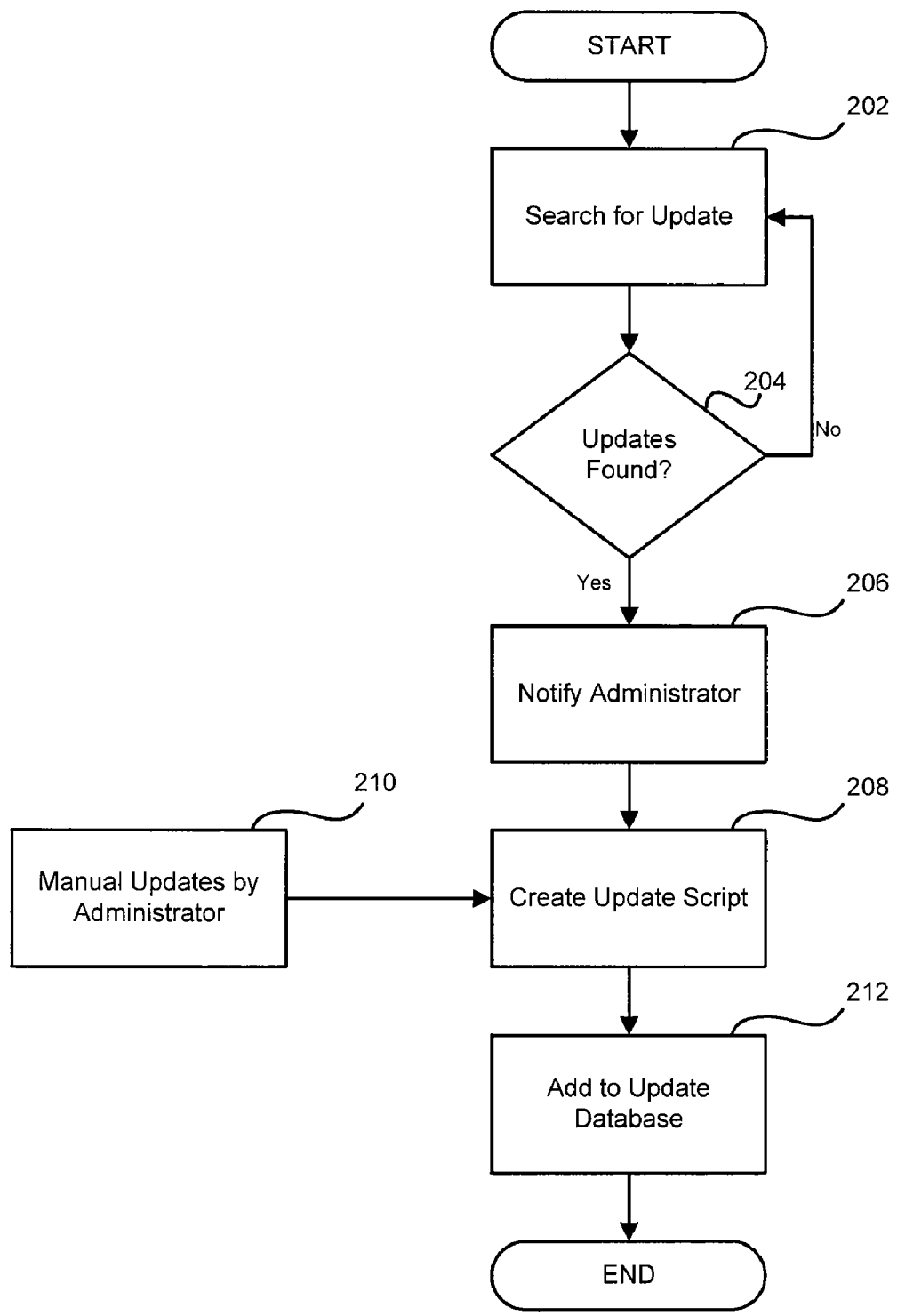
FIG. 2 is a flowchart illustrating the determining the availability of a software update according to the present invention.

Turning now to FIG. 2, there is shown a flow chart depicting the operation of one aspect of the present invention. As shown in FIG. 2, there is a method for searching for updates or fixes that necessitate being uploaded to a subscribing system. In one embodiment, a daemon residing on the host server 102 performs the search for updates visualized in FIG. 2. The skilled artisan will appreciate that a daemon, as contemplated in this embodiment, is a networking program that performs a housekeeping or maintenance utility function without being called by a user. A daemon sits in the background and is activated only when needed, for example, to correct an error from which another program cannot recover. Running in the background of the host server 102, the search for update daemon, or search daemon, searches for updates beginning at step 202. When an update is uncovered by the search daemon at step 204, the system administrator for the remote site 160 is notified of the discovery at step 206.

In the event that an update has not been found at step 204, the search daemon resumes searching for an update by returning to step 202. After the notification to the administrator at step 206, the search daemon creates an update script at step 208. As will be understood by those skilled in the art, the update script is suitably written in a language that the program to be updated or patched understands, thereby obviating the need to compile the script into object code for execution. It will further be appreciated herein that the search daemon need not solely be responsible for uncovering new updates or patches.

As shown in FIG. 2, at step 210, the remote site 160 system administrator generates or otherwise inputs an update, patch or fix to the host server 102. These manual updates are subsequently detected by the search daemon and at step 208, the manual updates are transformed into update scripts. It will be understood by those skilled in the art that the generation of the update scripts may be accomplished by the search daemon or by the remote site 160 system administrator, either process being acceptable to the operation of the subject invention. Irrespective of manual or automatic detection of updates, the new script is added to the update database 106 for later uploading, or pushing, to a subscribing system. The update scripts, or installation scripts, act to apply the updates, patches or fixes to the subscribing system. In accordance with the present invention, all installation scripts will be tested and verified prior to uploading the same to the subscribing system. Upon completion of the steps outlined in FIG. 2, the search daemon on the host server 102 has updated the database 106 with the most current updates, patches or fixes.

Figure 3:
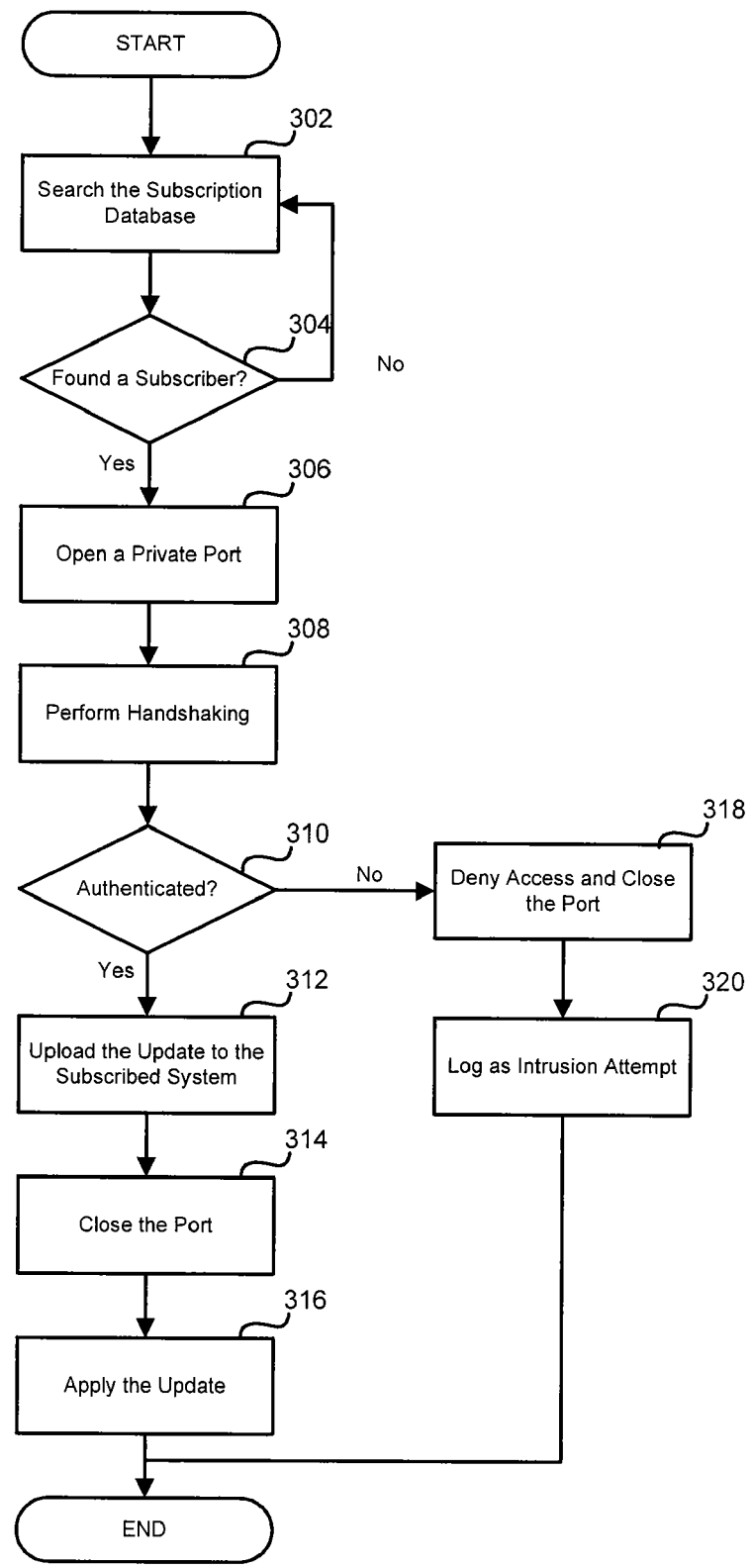
FIG. 3 is a flowchart illustrating the method of providing software updates to a remote computer system.

Referring now to FIG. 3, there is shown a flow chart representative of the method of the present invention, whereby the most current updates, patches or fixes are pushed, that is uploaded, to a subscribing system. Beginning at step 302, a search of the subscription database 106, is conducted, looking for a subscriber. It will be appreciated that the database 106, referenced above as an update database, may also incorporate the subscription database on the same drive. It will further be appreciated that the use of the reference number 106, with respect to FIG. 1, is to facilitate the visualization of the system 100 and not to limit the system 100 to a single database. Rather, the depiction of the database 106 is meant to illustrate a hardware configuration containing one or more databases.

In a preferred embodiment, the search for a subscriber is conducted by an update daemon, separate from the search daemon. It will be appreciated by those skilled in the art that the update daemon and the search daemon may be either separate or a single program. Either configuration for the daemons will allow the subject invention to function in accordance with the method described herein. Turning to step 304, a determination is made that a subscriber has been found by the update daemon. When, at step 304, no subscriber is found, the search will continue by returning to step 302. After positive determination of the existence of a subscriber at step 304, the daemon proceeds to direct the host server 102 to activate, or open, a private port from the remote site 160 to the customer site 150. As discussed previously, the private port enables direct contact between each of the systems 108, 112, 114, 116, and 118 and the host server 102.

At step 308, the host server 102, at the direction of the update daemon, conducts a handshaking procedure with the customer site 150. As will be understood by those skilled in the art, a handshaking procedure utilizes the username/password authentication procedures, or other means of verifying the rights of the host server 102 to upload updates. The subscribing system of the customer site 150 then determines at step 310 whether or not the host server 102 has provided sufficient authentication to access the customer site 150. A negative determination at step 310 directs the customer site 150 to deny access and close the private port at step 318. With the connection between the remote site 160 and the customer site 150 terminated at step 318, the subscribed system of the customer site 150 logs the failed attempt as an intrusion attempt at step 320 and provides notification to the customer site 150 system administrator of the attempt.

However, if at step 310 the subscribing system of the customer site 150 determines that the remote site 160 has provided sufficient proof of authentication, the customer site 150 allows the update daemon to upload, or push, the scripts containing the updates, fixes or patches to the subscribing system. The update daemon then directs the host server 102 to close the private port at step 314 and logs the transaction in the database 106 to prevent subsequent uploads of the same updates, patches or fixes. The subscribing system of the customer site 150 will then apply the update at step 316. It will be appreciated that the application of the update may be accomplished by the subscribing system of the customer site 150 running the installation script automatically or by notifying the customer site 150 system administrator of the uploaded update and allowing the administrator to apply the update at a more convenient time.

The foregoing description of a preferred embodiment of the invention has been presented for purposes of illustration and description. It is not intended to be exhaustive or to limit the invention to the precise form disclosed. Obvious modifications or variations are possible in light of the above teachings. For example, the foregoing description may suitably be adapted to computer-readable medium of instructions for performing the above-described method. The embodiment was chosen and described to provide the best illustration of the principles of the invention and its practical application to thereby enable one of the ordinary skilled in the art to utilize the invention in various embodiments and with various modifications as are suited to the particular use contemplated. All such modifications and variations are within the scope of the invention as determined by the appended claims when interpreted in accordance to the breadth to which they are fairly, legally and equitably entitled.

What is claimed is:

1. A system for remotely securing software updates of computer systems comprising:
    a server adapted to receive software updates from a plurality of sources;
    means adapted to receive installation scripts, each of which is associated with at least one software update disposed on the server;
    a secured data storage adapted to store data representative of a plurality of remote data processing devices;
    registration means, disposed in the server, adapted for receiving registration data from each of the plurality of remote data processing devices specific thereto, wherein registration data includes,
        authenticating credentials for establishing a secure data communication path between the server and remote data processing device,
        identification data corresponding to identification of installed software;
        update parameter data corresponding to specified timing of software updates, and
        data corresponding to selective manual and automatic installation of software updates;
    authentication means adapted for receiving a login request from each remote data processing device including means adapted for comparing the received login request with the remote data processing device data;
    means adapted for selectively placing the server in secure data communication with each requesting remote data processing device in accordance with a determination of the authentication means, wherein a secure data communication channel is established in accordance with registration data;
    means adapted for testing updates received into the server against received registration data to determine each remote data processing device for which updates are appropriate; and
    means adapted for selectively pushing software updates from the server, a long with an associated installation script, in accordance with a received login request and in accordance with associated registration data.

2. The system for remotely securing software updates of computer systems of claim 1 further comprising means adapted for periodically establishing a communication link between the server and the at least one remote data processing device to provide for regular communication of software updates therebetween.

3. The system for remotely securing software updates of computer systems of claim 2 wherein the means adapted for periodically establishing a communication link is associated with the server.

4. The system for remotely securing software updates of computer systems of claim 2 wherein the means adapted for periodically establishing a communication link is associated with the at least one remote data processing device.

5. The system for remotely securing software updates of computer systems of claim 1 further comprising means adapted to select the parameters for transmitting the software updates from the server.

6. The system for remotely securing software updates of computer systems of claim 1 wherein the means adapted for selectively transmitting the software updates from the server transmits the software updates upon receipt of a software update from at least one of the plurality of sources.

7. The system for remotely securing software updates of computer systems of claim 1 further comprising means adapted for transmitting a notification signal to an associated administrator upon receipt of a software update from at least one of the plurality of sources.

8. The system for remotely securing software updates of computer systems of claim 7 further comprising means adapted for selectively generating a software update transmission signal upon receipt of the notification signal in order to transmit the software update from the server.

9. The system for remotely securing software updates of computer systems of claim 1 further comprising testing means adapted for analyzing the received software updates to determine if the software updates are in compliance with selected criteria.

10. The system for remotely securing software updates of a computer systems of claim 1 further comprising a software update storage log means adapted to store selected information relating to received software updates.

11. A method for remotely securing software updates of computer systems comprising the steps of:
receiving, at a server, software updates from a plurality of sources;
receiving installation scripts at the server, each of which is associated with at least one software update disposed on the server;
storing data representative of a plurality of remote data processing devices in a secured data storage means;
receiving registration data from each of the plurality of remote data processing devices specific thereto, wherein registration data includes:
authentication credentials for establishing a secure data communication path between the server and remote data processing device,
identification data corresponding to identification of installed software,
update parameter data corresponding to specified timing of software updates, and
data corresponding to selective manual and automatic installation of software updates;
receiving a login request from each one remote data processing device and comparing the received login request with the remote data processing device data;
selectively placing the server in secure data communication with at each requesting remote data processing device in accordance with a comparison of the received login request with the remote data processing device data, wherein a secure data communication channel is established in accordance with registration data;
testing updates received into the server against received registration data to determine each remote data processing device for which updates are appropriate; and
selectively pushing software updates from the server, along with an associated installation script, in accordance with a received login request and in accordance with associated registration data.

12. The method for remotely securing software updates of computer systems of claim 11 further comprising the step periodically establishing a communication link between the server and the at least one remote data processing device to provide for regular communication of software updates therebetween.

13. The method for remotely securing software updates of computer systems of claim 12 wherein periodically establishing a communication link is via the server.

14. The method for remotely securing software updates of computer systems of claim 12 wherein for periodically establishing a communication link is via the at least one remote data processing device.

15. The method for remotely securing software updates of computer systems of claim 11 further comprising the step of selecting the parameters for transmitting the software updates from the server.

16. The method for remotely securing software updates of computer systems of claim 11 wherein the software updated is transmitted upon receipt of a software update from at least one of the plurality of sources.

17. The method for remotely securing software updates of computer systems of claim 11 further comprising the step of transmitting a notification signal to an associated administrator upon receipt of a software update from at least one of the plurality of sources.

18. The method for remotely securing software updates of computer systems of claim 17 further comprising the step of selectively generating a software update transmission signal upon receipt of the notification signal in order to transmit the software update from the server.

19. The method for remotely securing software updates of computer systems of claim 11 further comprising the step of analyzing the received software updates to determine if the software updates are in compliance with selected criteria.

20. The method for remotely securing software updates of a computer systems of claim 11 further comprising the step of selected information relating to received software updates in a software update storage means.

21. A computer-readable medium for remotely securing software updates of computer systems comprising:
a server adapted to receive software updates from a plurality of sources;
means adapted to receive installation scripts, each of which is associated with at least one software update disposed on the server;
a secured data storage adapted to store data representative of a plurality of remote data processing devices;
registration means, disposed in the server, adapted for receiving registration data from each of a plurality of remote data processing devices specific thereto, wherein registration data includes,
authentication credentials for establishing a secure data communication path between the server and remote data processing device,
identification data corresponding to identification of installed software,
update parameter data corresponding to specified timing of software updates; and
data corresponding to selective manual and automatic installation of software updates;
authentication means adapted for receiving a login request from at least one remote data processing device including means adapted for comparing the received login request with the secured user data;
means adapted for selectively placing the server in data communication with each remote data processing device in accordance with a determination of the authentication means, wherein a secure data communication channel is established in accordance with registration data;
means adapted for testing updates received into the server against received registration data to determine each remote data processing device for which updates are appropriate; and means adapted for selectively pushing software updates from the server, along with an associated installation script, in accordance with a received login request and in accordance with associated registration data.

22. The computer-readable medium for remotely securing software updates of computer systems of claim 21 further comprising means adapted for periodically establishing a communication link between the server and the at least one remote data processing device to provide for regular communication of software updates therebetween.

23. The computer-readable medium for remotely securing software updates of computer systems of claim 21 wherein the means adapted for selectively transmitting the software updates from the server transmits the software updates upon receipt of a software update from at least one of the plurality of sources.

24. The computer-readable medium for remotely securing software updates of computer systems of claim 21 further comprising means adapted for transmitting a notification signal to an associated administrator upon receipt of a software update from at least one of the plurality of sources.

25. The computer-readable medium for remotely securing software updates of computer systems of claim 24 further comprising means adapted for selectively generating a software update transmission signal upon receipt of the notification signal in order to transmit the software update from the server.

26. The computer-readable medium for remotely securing software updates of computer systems of claim 21 further comprising testing means adapted for analyzing the received software updates to determine if the software updates are in compliance with selected criteria.

* * * * *